(12) United States Patent
Morgan et al.

(10) Patent No.: US 12,550,959 B2
(45) Date of Patent: Feb. 17, 2026

(54) APPAREL WITH ADAPTIVE FIT

(71) Applicant: NIKE, Inc., Beaverton, OR (US)

(72) Inventors: Daniel P. Morgan, Beaverton, OR (US); Joshua Patrick Williams, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 245 days.

(21) Appl. No.: 16/988,110

(22) Filed: Aug. 7, 2020

(65) Prior Publication Data

US 2021/0045476 A1 Feb. 18, 2021

Related U.S. Application Data

(60) Provisional application No. 62/885,589, filed on Aug. 12, 2019, provisional application No. 62/924,527, (Continued)

(51) Int. Cl.
*A41D 27/28* (2006.01)
*A41D 13/015* (2006.01)
(Continued)

(52) U.S. Cl.
CPC ......... *A41D 27/28* (2013.01); *A41D 13/0156* (2013.01); *A41D 31/02* (2013.01); *A41D 31/125* (2019.02); *A41D 31/185* (2019.02); *B05C 5/0208* (2013.01); *B05C 11/00* (2013.01); *B05D 1/265* (2013.01); *B05D 1/286* (2013.01); *B05D 7/14* (2013.01); *B32B 3/085* (2013.01); *B32B 5/26* (2013.01); *B32B 7/05* (2019.01);
(Continued)

(58) Field of Classification Search
CPC ................ A41D 1/089; A41D 13/0015; A41D 13/0156; A41D 27/28; A41D 31/02; A41D 31/125; A41D 31/185; A41D 31/04; A41D 31/12; B32B 37/0076; B32B 7/05
USPC .............................................................. 2/69
See application file for complete search history.

(56) References Cited

U.S. PATENT DOCUMENTS 2,655,693 A  10/1953 Adams
3,300,557 A   1/1967 Luciano
(Continued)

FOREIGN PATENT DOCUMENTS

CN     2521924 Y    11/2002
CN   102613730 A     8/2012
(Continued)

OTHER PUBLICATIONS

International Search Report and Written Opinion received for PCT Patent Application No. PCT/CN2020/108643, mailed on Nov. 18, 2020, 9 pages.
(Continued)

*Primary Examiner* — Uyen T Nguyen
(74) *Attorney, Agent, or Firm* — Shook, Hardy & Bacon L.L.P.

(57) ABSTRACT

Aspects herein are directed to articles of apparel formed from a base textile and including a plurality of discrete overlay film structures affixed to the base textile at one or more locations on the article of apparel. When exposed to an external stimulus, the film structures undergo an increase in dimension in at least the z-direction and the base textile undergoes a decrease in dimension in one or more of the x-direction and the y-direction.

21 Claims, 10 Drawing Sheets

Related U.S. Application Data filed on Oct. 22, 2019, provisional application No. 62/951,154, filed on Dec. 20, 2019, provisional application No. 62/972,426, filed on Feb. 10, 2020.

(51) Int. Cl.

| | | |
|---|---|---|
| A41D 31/02 | (2019.01) | |
| A41D 31/12 | (2019.01) | |
| A41D 31/18 | (2019.01) | |
| B05C 5/02 | (2006.01) | |
| B05C 11/00 | (2006.01) | |
| B05D 1/26 | (2006.01) | |
| B05D 1/28 | (2006.01) | |
| B05D 7/14 | (2006.01) | |
| B32B 3/08 | (2006.01) | |
| B32B 3/26 | (2006.01) | |
| B32B 5/26 | (2006.01) | |
| B32B 7/05 | (2019.01) | |
| B32B 37/00 | (2006.01) | |
| D06B 1/02 | (2006.01) | |

(52) U.S. Cl.
CPC .......... *B32B 37/0076* (2013.01); *D06B 1/02* (2013.01); *B32B 3/266* (2013.01); *B32B 2274/00* (2013.01); *B32B 2305/18* (2013.01); *B32B 2307/728* (2013.01); *B32B 2307/734* (2013.01); *Y10T 442/162* (2015.04); *Y10T 442/3854* (2015.04); *Y10T 442/40* (2015.04)

(56) References Cited

U.S. PATENT DOCUMENTS

| | | | |
|---|---|---|---|
| 3,417,175 A | 12/1968 | Brown et al. | |
| 3,439,083 A | 4/1969 | Ugolini | |
| 3,791,906 A | 2/1974 | Farkas | |
| 4,415,623 A | 11/1983 | Schlaepfer | |
| 4,655,868 A | 4/1987 | Hefele | |
| 4,880,588 A | 11/1989 | Brault et al. | |
| 4,944,979 A | 7/1990 | Gagliano et al. | |
| 5,498,307 A | 3/1996 | Stevenson | |
| 5,773,080 A | 6/1998 | Simmons et al. | |
| 5,937,272 A | 8/1999 | Tang | |
| 6,194,119 B1 | 2/2001 | Wolk et al. | |
| 6,296,732 B1 | 10/2001 | Enlow et al. | |
| 6,733,870 B2 | 5/2004 | Enlow et al. | |
| 6,767,807 B2 | 7/2004 | Shibata et al. | |
| 6,773,537 B2 | 8/2004 | Erickson et al. | |
| 6,809,045 B1 | 10/2004 | Alam et al. | |
| 8,039,373 B2 | 10/2011 | Fujinawa et al. | |
| 8,574,668 B2 | 11/2013 | Brown et al. | |
| 8,956,685 B2 | 2/2015 | Bogue et al. | |
| 9,732,454 B2 | 8/2017 | Davis et al. | |
| 10,170,341 B1 | 1/2019 | Lin et al. | |
| 2004/0209057 A1 | 10/2004 | Enlow et al. | |
| 2005/0252602 A1 | 11/2005 | Tateishi | |
| 2006/0154546 A1 | 7/2006 | Murphy et al. | |
| 2006/0260024 A1 | 11/2006 | Lee | |
| 2007/0016999 A1* | 1/2007 | Harber | A41D 13/0015 2/69 |
| 2007/0026265 A1 | 2/2007 | Sakurai et al. | |
| 2007/0042660 A1* | 2/2007 | Waxler | A41D 31/00 442/181 |
| 2007/0161305 A1 | 7/2007 | Wangbunyen | |
| 2007/0270067 A1 | 11/2007 | Yasui et al. | |
| 2007/0293106 A1* | 12/2007 | Harber | A41D 1/04 442/2 |
| 2008/0057809 A1* | 3/2008 | Rock | A41D 27/28 442/119 |
| 2008/0075850 A1* | 3/2008 | Rock | A41D 31/065 427/176 |
| 2008/0104738 A1 | 5/2008 | Conley et al. | |
| 2008/0254263 A1 | 10/2008 | Yasui et al. | |
| 2009/0276936 A1* | 11/2009 | Makida | D06M 15/568 428/196 |
| 2011/0296580 A1 | 12/2011 | Demarest et al. | |
| 2012/0282403 A1 | 11/2012 | Ray et al. | |
| 2014/0000004 A1 | 1/2014 | Baron et al. | |
| 2014/0082815 A1* | 3/2014 | Harber | A41D 31/185 2/69 |
| 2015/0246327 A1 | 9/2015 | Nichols et al. | |
| 2016/0242474 A1 | 8/2016 | Baschak et al. | |
| 2016/0338415 A1 | 11/2016 | Aihara | |
| 2016/0338435 A1* | 11/2016 | Aihara | A41D 1/08 |
| 2016/0340826 A1 | 11/2016 | Tibbits et al. | |
| 2017/0071275 A1 | 3/2017 | Darby | |
| 2017/0105466 A1 | 4/2017 | Baschak et al. | |
| 2017/0144344 A1 | 5/2017 | Schmidt et al. | |
| 2017/0273377 A1 | 9/2017 | Aihara et al. | |
| 2017/0340037 A1 | 11/2017 | Bailey et al. | |
| 2018/0049698 A1 | 2/2018 | Berg et al. | |
| 2018/0142389 A1* | 5/2018 | Diaz | A41D 27/28 |
| 2018/0192720 A1* | 7/2018 | Blackford | B32B 27/36 |
| 2018/0194106 A1 | 7/2018 | Tibbits et al. | |
| 2018/0195213 A1* | 7/2018 | Tibbits | D03D 15/567 |
| 2018/0195216 A1 | 7/2018 | Lin | |
| 2018/0319134 A1 | 11/2018 | Abbondanzio et al. | |
| 2020/0131695 A1 | 4/2020 | Lao et al. | |
| 2020/0164610 A1 | 5/2020 | Davis et al. | |
| 2020/0215786 A1 | 7/2020 | Dorton et al. | |
| 2021/0045474 A1 | 2/2021 | Koshkaroff et al. | |
| 2021/0045477 A1 | 2/2021 | Morgan et al. | |
| 2022/0030992 A1 | 2/2022 | Koshkaroff et al. | |
| 2022/0347717 A1 | 11/2022 | Janes et al. | |
| 2023/0157392 A1 | 5/2023 | Koshkaroff et al. | |

FOREIGN PATENT DOCUMENTS

| | | |
|---|---|---|
| CN | 103519427 A | 1/2014 |
| CN | 104859270 A | 8/2015 |
| CN | 106029234 A | 10/2016 |
| CN | 107750130 A | 3/2018 |
| CN | 108471823 A | 8/2018 |
| EP | 0360929 A1 | 4/1990 |
| EP | 0789543 B1 | 6/2002 |
| EP | 2411210 B1 | 7/2016 |
| EP | 3449743 A1 | 3/2019 |
| FR | 2856708 A1 | 12/2004 |
| GB | 2184399 B | 2/1990 |
| JP | 60-072800 A | 4/1985 |
| JP | 2000-195665 A | 7/2000 |
| JP | 2002-338908 A | 11/2002 |
| JP | 2003-322715 A | 11/2003 |
| KR | 10-2009-0102426 A | 9/2009 |
| TW | 201225160 A | 6/2012 |
| WO | 2009/041916 A1 | 4/2009 |
| WO | 2019/155348 A1 | 8/2019 |
| WO | 2019/169079 A1 | 9/2019 |
| WO | 2021/027837 A1 | 2/2021 |
| WO | 2021/096724 A1 | 5/2021 |

OTHER PUBLICATIONS

International Search Report and Written Opinion received for PCT Patent Application No. PCT/US2020/045753, mailed on Oct. 29, 2020, 14 pages.

International Search Report and Written Opinion received for PCT Patent Application No. PCT/US2020/045755, mailed on Oct. 29, 2020, 13 pages.

International Search Report and Written Opinion received for PCT Patent Application No. PCT/US2020/045756, mailed on Oct. 29, 2020, 14 pages.

International Preliminary Report on Patentability received for PCT Patent Application No. PCT/CN2020/108643, mailed on Feb. 24, 2022, 5 pages.

International Preliminary Report on Patentability received for PCT Patent Application No. PCT/US2020/045753, mailed on Feb. 24, 2022, 9 pages.

(56) References Cited

OTHER PUBLICATIONS

International Preliminary Report on Patentability received for PCT Patent Application No. PCT/US2020/045755, mailed on Feb. 24, 2022, 8 pages.
International Preliminary Report on Patentability received for PCT Patent Application No. PCT/US2020/045756, mailed on Feb. 24, 2022, 9 pages.
Non-Final Office Action received for U.S. Appl. No. 16/988,093, mailed on Mar. 22, 2022, 8 pages.
Final Office Action received for U.S. Appl. No. 16/988,116, mailed on Jan. 19, 2023, 9 pages.
International Search Report and Written Opinion received for PCT Patent Application No. PCT/US2022/046742, mailed on Jan. 26, 2023, 13 pages.
Non-Final Office Action received for U.S. Appl. No. 18/100,362, mailed on May 24, 2023, 12 pages.
Extended European Search Report received for European Patent Application No. 20852126.0, mailed on Sep. 8, 2023, 9 pages.
Non-Final Office Action received for U.S. Appl. No. 16/988,116, mailed on Sep. 27, 2023, 9 pages.
Communication pursuant to Rules 161(1) and 162 EPC received for European Application No. 20761936.2, mailed on Mar. 22, 2022, 3 pages.
Extended European Search Report received for European Application No. 24177068.4, mailed on Oct. 18, 2024, 8 pages.
Final Office Action received for U.S. Appl. No. 16/988,116, mailed on Jun. 24, 2024, 9 pages.
Final Office Action received for U.S. Appl. No. 17/634,086, mailed on Jun. 17, 2025, 10 pages.
Final office action received for U.S. Appl. No. 18/100,362, mailed on Dec. 13, 2023, 7 pages.
Intention to Grant received for European Application No. 20761444.7, mailed on Dec. 15, 2023, 6 pages.
Intention to Grant received for European Application No. 22809559.2, mailed on Sep. 10, 2025, 6 pages.
Lee et al., "Preparation and Characterization of Acrylic Pressure-sensitive Adhesives Based on UV and Heat Curing Systems", International Journal of Adhesion and Adhesives, vol. 75, Mar. 10, 2017, pp. 190-195.
Lee Products Company, "New Sortkwik Fingertip Moistener", Available online at: <https://www.youtube.com/watch?v=rb6ynWoovS0>, Mar. 6, 2015, 4 pages.
Material Properties—"Polyamide—Nylon—Density—Strength—Melting Point—Thermal Conductivity" Webpage found at <https://material-properties.org/polyamide-nylon-density-strength-melting-point-thermal-conductivity/> Not Prior Art. (Year: 2024).
Non-Final Office Action received for U.S. Appl. No. 17/505,198, mailed on Apr. 22, 2024, 18 pages.
Non-Final Office Action received for U.S. Appl. No. 17/634,086, mailed on Dec. 19, 2024, 9 pages.
Non-Final Office Action received for U.S. Appl. No. 17/634,086, mailed on Sep. 8, 2025, 9 pages.
Notice of Allowance received for U.S. Appl. No. 16/988,116, mailed on Mar. 3, 2025, 9 pages.
Notice of Allowance received for U.S. Appl. No. 17/505,198, mailed on Aug. 14, 2024. 9 pages.
Notice of Allowance received for U.S. Appl. No. 17/505,198, mailed on Nov. 20, 2024, 4 pages.
Notice of Allowance received for U.S. Appl. No. 18/100,362, mailed on Apr. 4, 2024, 8 pages.
Notice of Allowance received for U.S. Appl. No. 18/100,362, mailed on Jun. 20, 2024, 2 pages.
Office Action received for European Application No. 20761445.4, mailed on Dec. 14, 2023, 6 pages.
Office Action received for European Application No. 20761936.2, mailed on Dec. 13, 2023, 4 pages.
Office Action received for European Application No. 20852126.0, mailed on Jul. 22, 2024, 5 pages.
Bixby adds third dimension to plastic sheet extrusions, Plastics, Available online at: <https://www.plastics.gl/extrusion-film/bixby-adds-third-dimension-to-plastic-sheet-extrusions/#:~:text=The%20company%20Bixby%20International%20has,profiles%20in%20their%20extruded%20sheet.>, 2019, 2 pages.
Non-Final Office Action received for U.S. Appl. No. 16/988,116, mailed on Sep. 14, 2022, 9 pages.
Notice of Allowance received for U.S. Appl. No. 16/988,093, mailed on Sep. 21, 2022, 8 pages.
Hardy, Norm, "What is Patterned Thin Film Deposition for Lift off?", Semicore, Available online at: <http://www.semicore.com/news/73-thin-film-deposition-lift-off>, Sep. 16, 2013, 2 pages.
Yang, Lei, "Patterning Technique", ScienceDirect, Available online at: <https://www.sciencedirect.com/topics/engineering/patterning-method>, 2015, 22 pages.

* cited by examiner

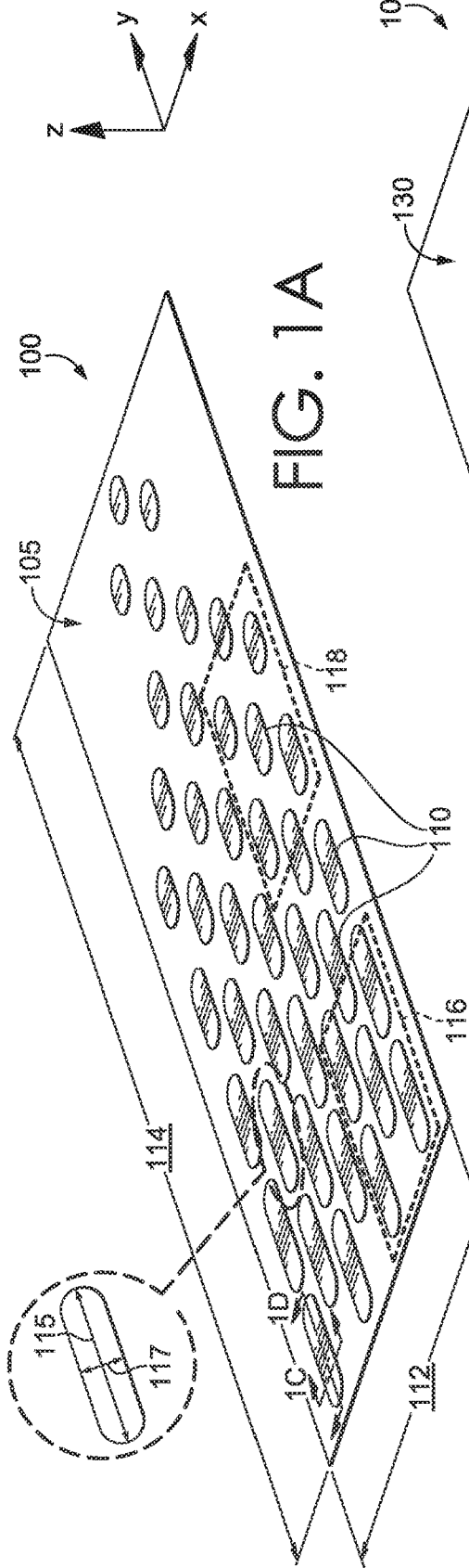
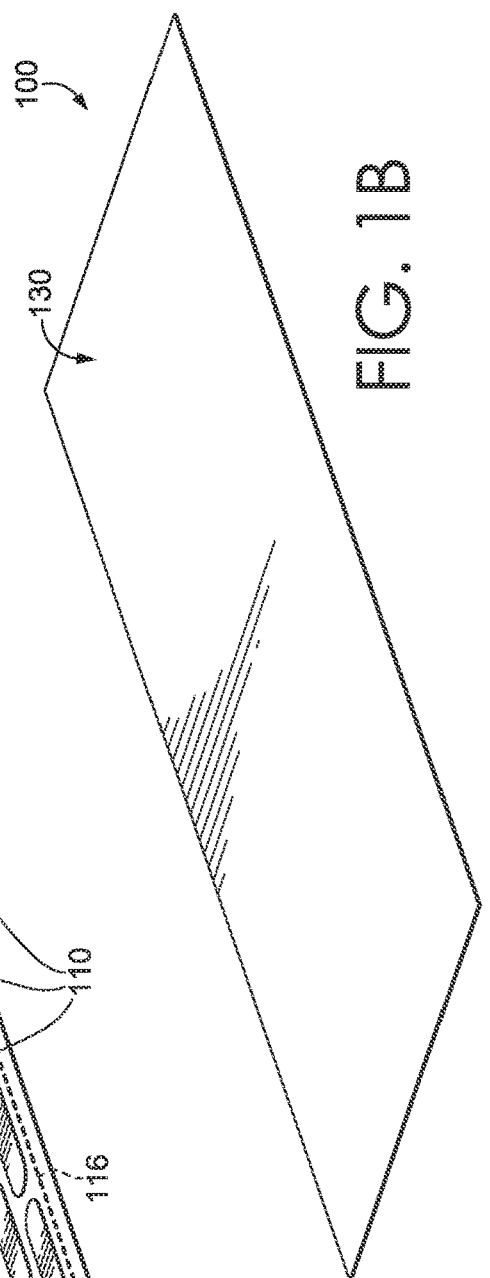
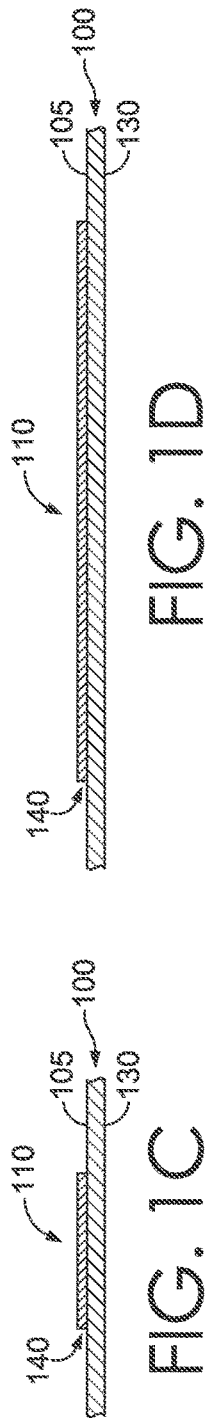

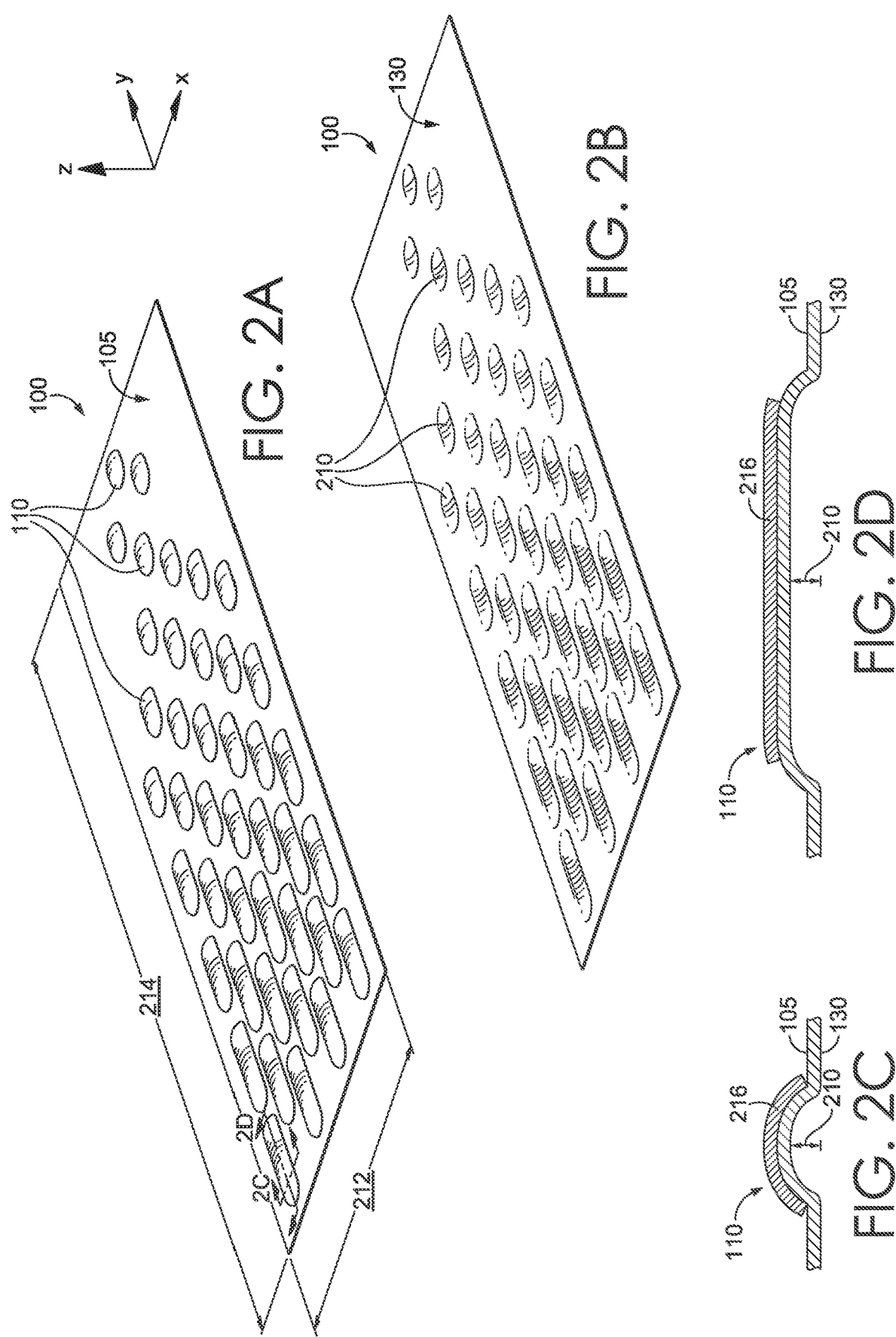

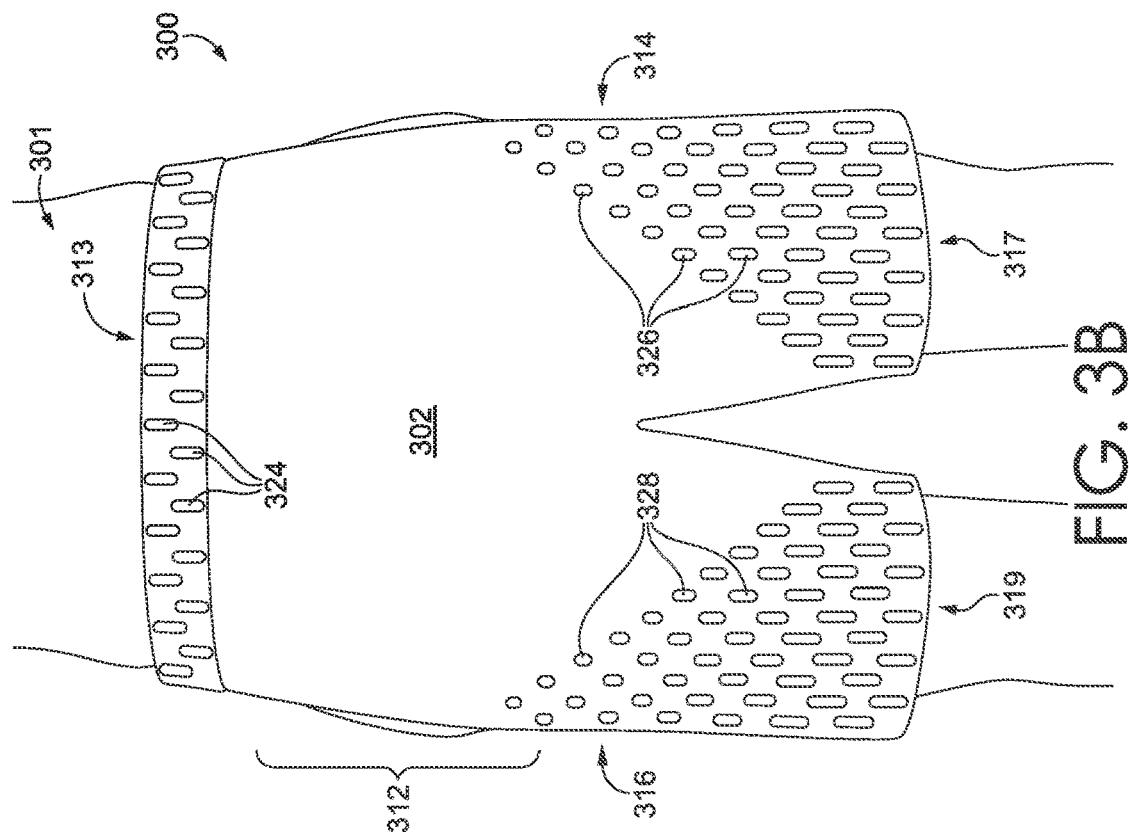
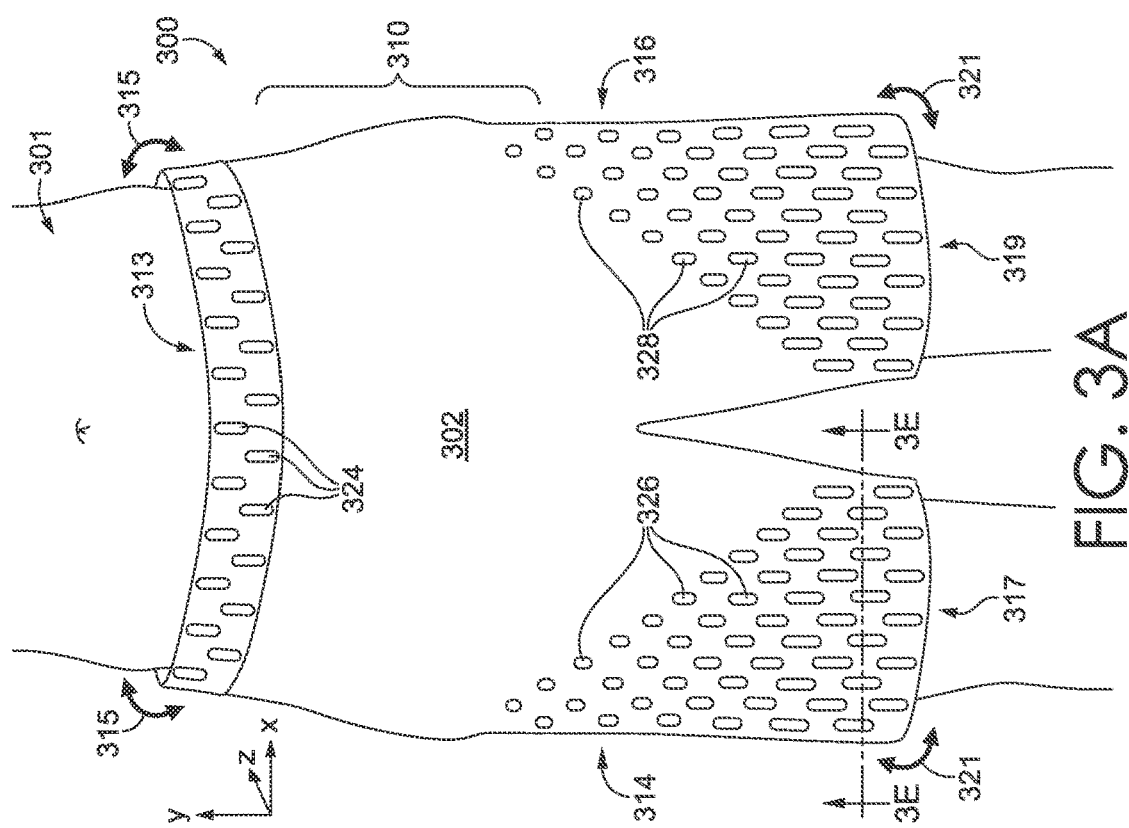
FIG. 3B
FIG. 3A

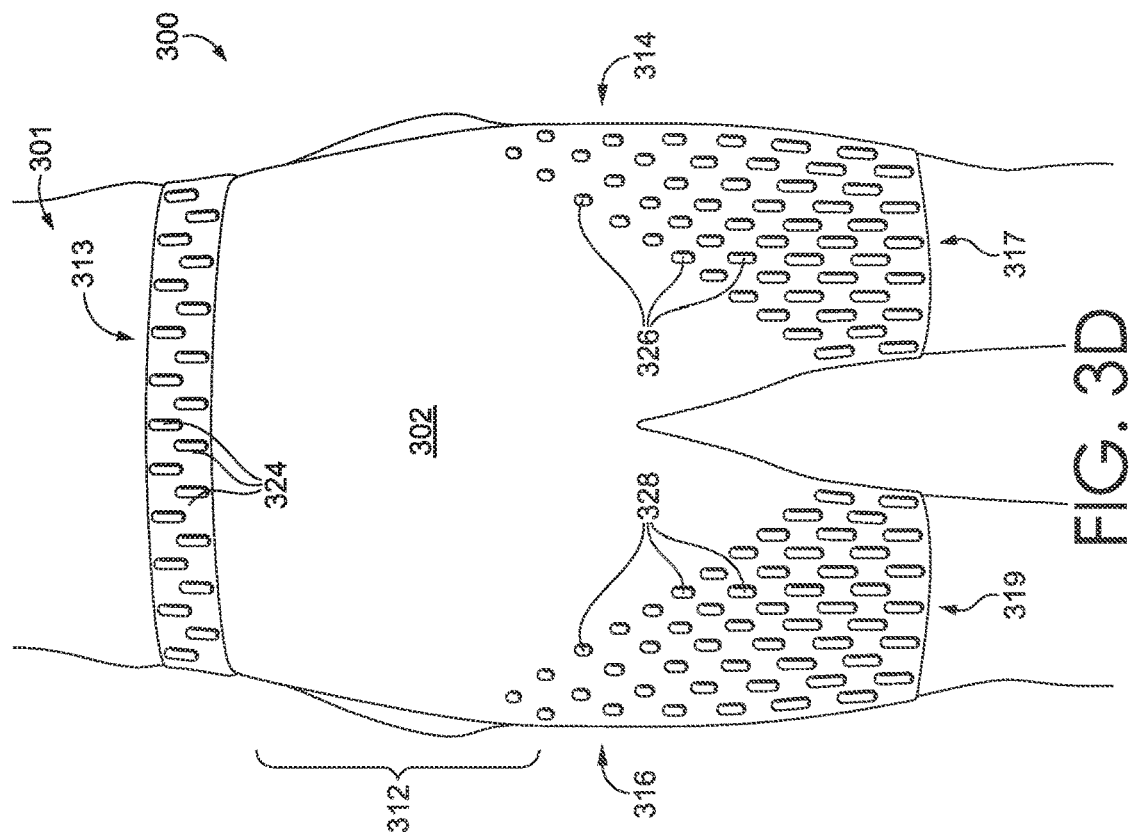
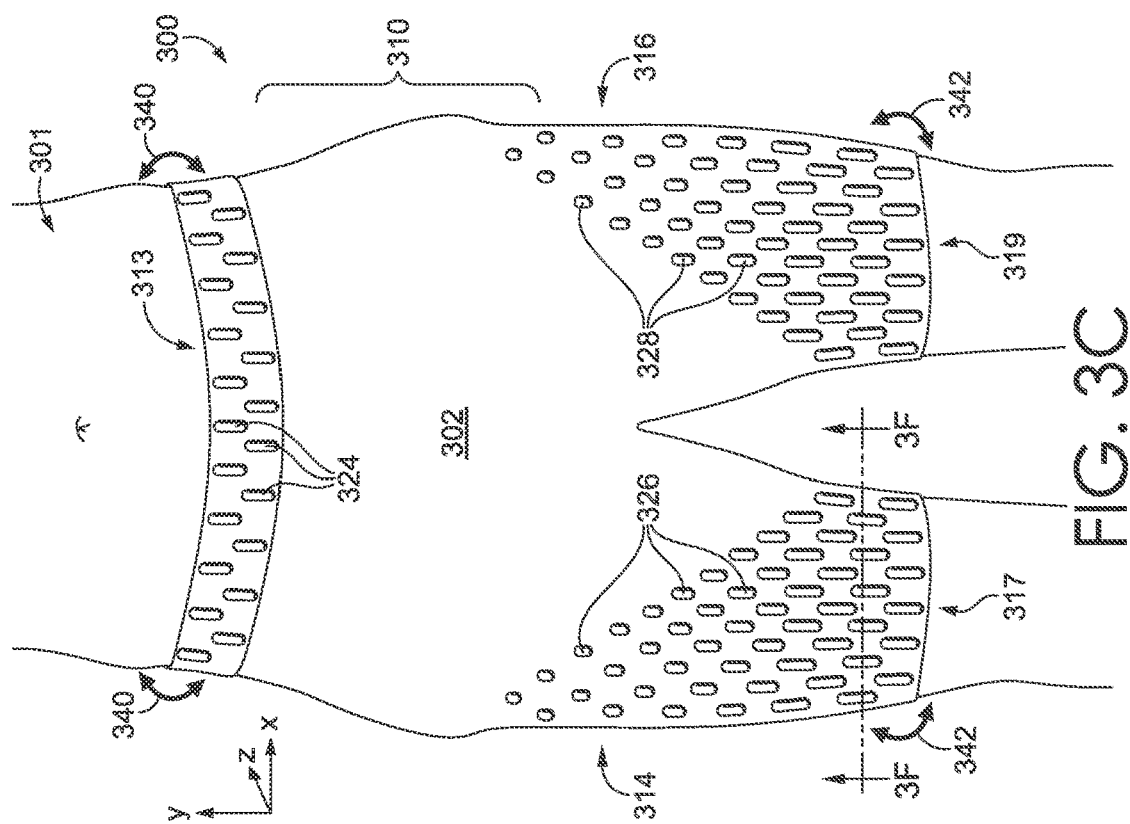

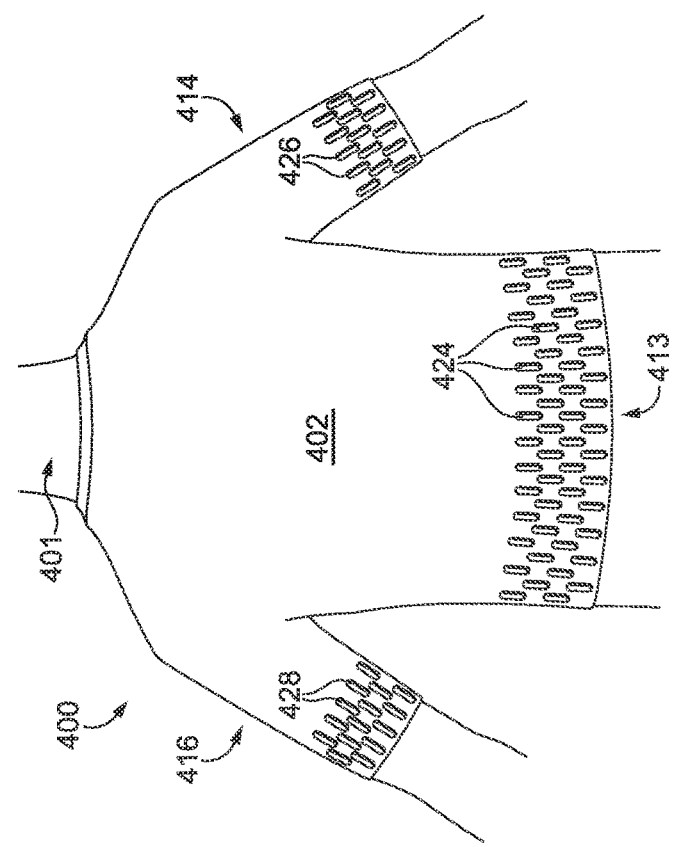
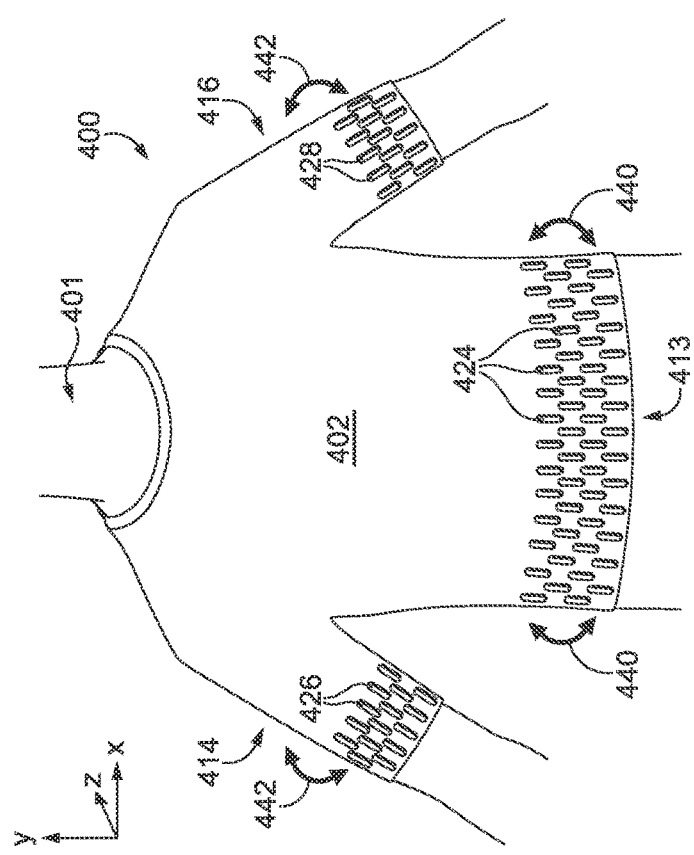

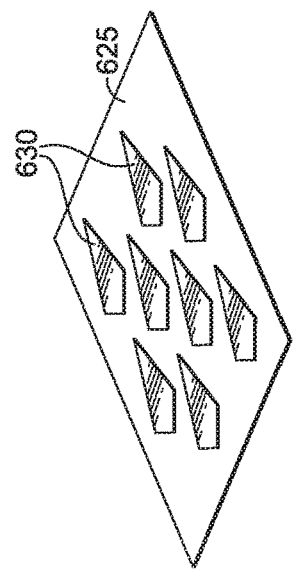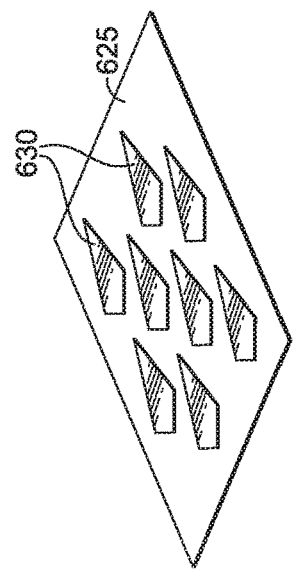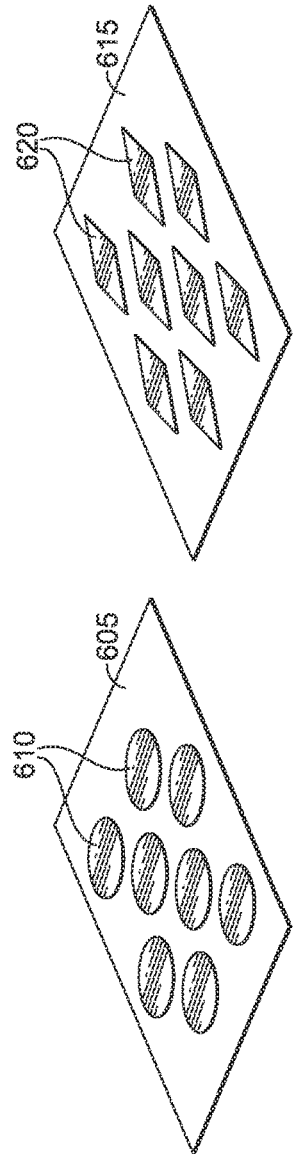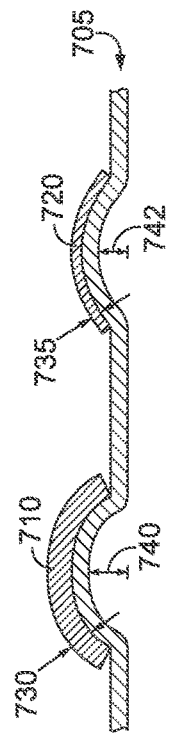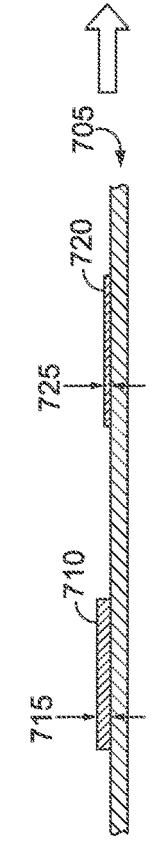

APPAREL WITH ADAPTIVE FIT

CROSS-REFERENCE TO RELATED APPLICATIONS

This application, assigned U.S. application Ser. No. 16/988,110, filed Aug. 7, 2020, and entitled "Apparel with Adaptive Fit," claims the benefit of priority of U.S. Provisional App. No. 62/885,589, filed Aug. 12, 2019, and entitled "Apparel with Adaptive Fit," U.S. Provisional App. No. 62/924,527, filed Oct. 22, 2019, and entitled "Apparel with Dynamic Vent Structure," U.S. Provisional App. No. 62/951,154, filed Dec. 20, 2019, and entitled "Methods, Systems, and Articles for Producing a Film Pattern on a Substrate Material," and U.S. Provisional App. No. 62/972,426, filed Feb. 10, 2020, and entitled "Apparel with Cling Reduction Features." The entireties of the aforementioned applications are incorporated by reference herein.

TECHNICAL FIELD

Aspects herein are directed to an article of apparel that utilizes discrete overlay film structures that are responsive to an external stimulus to achieve an adaptive fit.

BACKGROUND

Traditional articles of apparel generally have a static level of fit across different environmental conditions.

BRIEF DESCRIPTION OF THE DRAWINGS

Examples of aspects herein are described in detail below with reference to the attached drawing figures, wherein:

FIG. 1A illustrates a perspective view of a first surface of an example textile having a plurality of discrete overlay film structures before the textile is exposed to an external stimulus in accordance with aspects herein;

FIG. 1B illustrates a perspective view of a second opposite surface of the textile of FIG. 1A in accordance with aspects herein;

FIG. 1C illustrates a cross-sectional view of the textile of FIG. 1A taken along cut line 1C-1C in accordance with aspects herein;

FIG. 1D illustrates a cross-sectional view of the textile of FIG. 1A taken along cut line 1D-1D in accordance with aspects herein;

FIG. 2A illustrates a perspective view of the first surface of the textile of FIG. 1A after the textile is exposed to the external stimulus in accordance with aspects herein;

FIG. 2B illustrates a perspective view of the second opposite surface of the textile of FIG. 2A in accordance with aspects herein;

FIG. 2C illustrates a cross-sectional view of the textile of FIG. 2A taken along cut line 2C-2C in accordance with aspects herein;

FIG. 2D illustrates a cross-sectional view of the textile of FIG. 2A taken along cut line 2D-2D in accordance with aspects herein;

FIGS. 3A-3B illustrate a front view and a back view respectively of an example lower-body garment having a plurality of discrete overlay film structures before the lower-body garment is exposed to an external stimulus in accordance with aspects herein;

FIGS. 3C-3D illustrate a front view and a back view of the lower-body garment of FIGS. 3A-3B after the lower-body garment is exposed to the external stimulus in accordance with aspects herein;

FIGS. 4C-4D illustrate a front view and a back view respectively of the upper-body garment of FIGS. 4A-4B after the upper-body garment is exposed to the external stimulus in accordance with aspects herein;

FIGS. 6A-6C illustrate different shape configurations for the overlay film structures in accordance with aspects herein;

FIG. 7A illustrates a side view of an example textile having overlay film structures with different thicknesses before the textile is exposed to an external stimulus in accordance with aspects herein;

FIG. 7B illustrates a side view of the textile of FIG. 7A after the textile is exposed to the external stimulus in accordance with aspects herein.

DETAILED DESCRIPTION

Figure 3E:
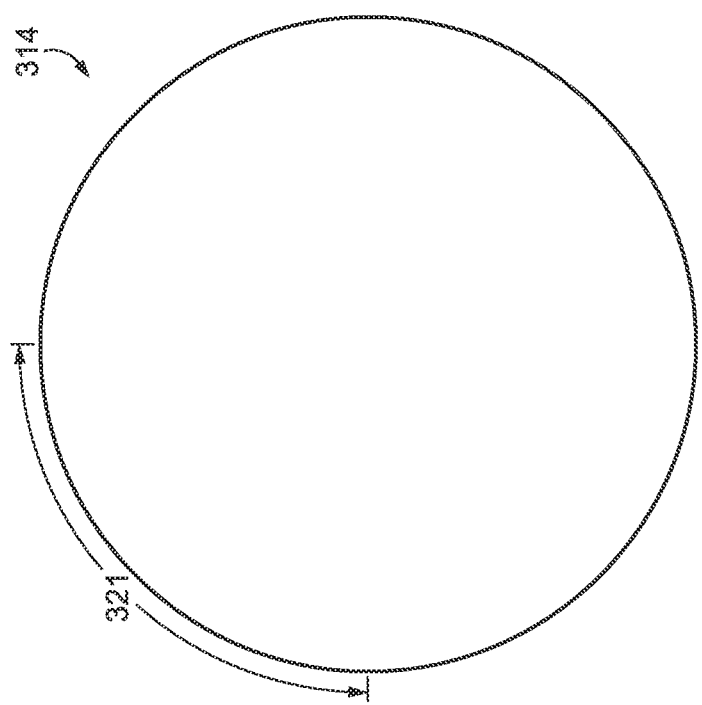
FIG. 3E illustrates a cross-sectional view of a leg portion of the lower body garment of FIG. 3A taken along cut line 3E-3E in accordance with aspects herein.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Traditional articles of apparel generally include a static level of fit across different environmental conditions. Aspects herein provide for an article of apparel formed from a base textile and having one or more overlay film structures affixed to the base textile that swell or increase in dimension in response to an external stimulus such as moisture. The change in dimension of the overlay film structures causes the base textile to also undergo a change in dimension resulting in an adjustment in the level of fit of the article of apparel.

At a high level, aspects herein are directed to an article of apparel formed of a base textile that includes a plurality of discrete overlay film structures affixed to the base textile in one or more locations on the article of apparel. When the overlay film structures are exposed to an external stimulus, such as moisture, the film structures undergo a change in dimension such as, for example, an increase in height in the z-direction, an increase in length in the y-direction, and/or an increase in width in the x-direction. Because the film structures are fully adhered to the base textile, the change in dimension of the film structures causes the base textile to also undergo a change in dimension, such as a decrease in width in the x-direction and/or a decrease in length in the y-direction due to the base textile "puckering" or being tensioned in the z-direction in areas underlying the overlay film structures.

The combination of the change in dimension of the overlay film structures and the base textile can be utilized to change the level of fit of the article of apparel. For example, when the overlay film structures are applied circumferentially around, for instance, a sleeve portion, a leg portion, and/or a torso portion of an article of apparel and the article of apparel is exposed to an external stimulus, such as moisture, the circumference of the sleeve portion, the leg portion, and/or the torso portion of the article may decrease due to the cumulative effect of the puckering of the base textile. This may be advantageous in situations where a tighter fit is desired to, for instance, reduce drag such as in swimming, surfing, or running. In another example, a tighter fit may be desired to reduce movement between the base textile and the wearer's skin surface. When the external stimulus is removed, the overlay film structures transition back to their pre-exposure state, the puckering or deformation of the base textile relaxes, and the circumference of the sleeve portion, the leg portion, and/or the torso portion reverts to its baseline circumference. Using a surfer wearing a board short as an example, when the surfer begins surfing, the board short tightens around, for instance, the surfer's legs reducing drag, and when the surfer is done surfing and the board short dries, the board short reverts to its pre-surfing appearance which may be a desirable aesthetic for the surfer.

As used herein, the term "article of apparel" encompasses any number of products meant to be worn by a wearer including upper-body garments (e.g., shirts, jackets, hoodies, pullovers), lower-body garments (e.g., pants, shorts, leggings), articles of footwear such as shoes or socks, articles of headwear (e.g., hats), gloves, sleeves (e.g., arm sleeves, calf sleeves), and the like. Positional terms used when describing the article of apparel such as front, back, inner-facing surface, outer-facing surface, proximal, distal, medial, lateral, and the like are with respect to the article of apparel being worn as intended with the wearer standing upright. As such, when the article of apparel is in the form of an upper-body garment or a lower-body garment, the front of the article of apparel is configured to cover, for instance, a front torso area, a front arm area, or a front leg area of the wearer, and the back of the article of apparel is configured to cover the back torso area, the back arm area, or the back leg area of the wearer. Similarly, the inner-facing surface of the article of apparel is configured to be in face-sharing contact (defined as a surface of a first material that is in contact or near contact with a surface of a second material) with a wearer's skin surface or a base layer, and the outer-facing surface of the article of apparel is configured to face toward the external environment.

The term "x-direction" when referring to, for instance, an upper-body garment means a direction extending along the horizontal width of the upper-body garment from one sleeve to the opposite sleeve. When referring to lower-body garments, the x-direction extends from one leg portion to the opposite leg portion. The term "y-direction" when referring to an upper-body garment means a direction extending along the vertical length of the upper-body garment from a neck opening to a waist opening or from a sleeve opening to the neck opening. When referring to lower-body garments, the y-direction extends from a waist opening to a leg opening. The term "z-direction" means a direction that extends away from the surface of the upper- or lower-body garments in a positive or negative direction and that is orthogonal to the x- and y-directions.

The term "external stimulus" as used herein encompasses any number of stimuli such as temperature, pressure, moisture, electrical energy, magnetic energy, light, sound, and the like. In one example aspect, the external stimulus is moisture where the moisture can be in the form of liquid water, water vapor, perspiration, and the like.

The term "base textile" as used herein means any material or fabric that is used to form, at least in part, an article of apparel. In example aspects, the degree of puckering or movement of the base textile in the z-direction may be dependent on a number of factors associated with the base textile. For example, the degree of movement of the base textile in the z-direction may be dependent on the moisture regain value of the yarn(s) used to form the base textile where moisture regain is defined as the percentage of moisture an oven-dry fiber or filament will absorb from the air when at standard temperature and relative humidity. As an example, when the base textile is formed from yarns having a low moisture regain, such as polyester or nylon, the base textile may undergo a greater degree of deformation or puckering compared to when the base textile is formed from yarns having a high moisture regain, such as cotton. This is because yarns having a high moisture regain will typically absorb moisture causing the yarn to swell or expand which counteracts the tensioning forces generated by the swelling of the overlay film structures and results in a lesser degree of puckering of the base textile.

Another factor that influences the degree of movement of the base textile in the z-direction is its weight. In aspects, the base textile may comprise a lightweight fabric (e.g., from about 30 grams per square meter (gsm) to about 150 gsm) or an ultra-lightweight fabric (e.g., from about 10 gsm to about 100 gsm) although heavier weight fabrics are contemplated herein. Lightweight and ultra-lightweight fabric may pucker to a greater degree than heavier weight fabrics. In further example aspects, the degree of movement of the base textile in the z-direction may be dependent on the presence of elastomeric yarns that exhibit stretch and recovery properties such as, for example, Spandex®. When, for example, textile types, textile weights, and textile constructions (e.g., knit or woven) are the same, base textiles that include elastomeric yarns may exhibit a greater degree of movement in the z-direction than textiles that do not include elastomeric yarns. Thus, the degree of movement of the base textile in the z-direction may be adjusted based on the type of yarn used to form the base textile, the weight of the base textile, and/or the use of elastomeric yarns in the base textile.

The term "discrete overlay film structure" as used herein refers to a film application on the base textile where each film structure is spaced apart from (i.e., discrete from) an adjacent film structure by an expanse or portion of the base textile. In example aspects, the film may be applied to the base textile using an intermediate adhesive layer that fully adheres the film to the base textile. Aspects herein contemplate that the film may comprise any film that expands in one or more of the x-direction, the y-direction, and/or the z-direction when exposed to an external stimulus such as moisture while remaining affixed or adhered to the base textile. In an example aspect, the film may comprise a thermoplastic polyester elastomer (TPEE), and more specifically a poly-butylene terephthalate based (PBT-based) TPEE film that is configured to transport or diffuse moisture from one surface of the film to a second opposite surface of the film. The transport of the moisture may be facilitated by the presence of hydrophilic molecules (molecules that attract or have an affinity for water) within the film where a greater number of hydrophilic molecules may result in a greater transport of moisture. The movement of moisture through the film may be measured using a water vapor transmission test such as ASTM E96 B, and in example aspects, the water vapor transmission rate of the film may be from about 600 $g/m^2/day$ to about 10,000 $g/m^2/day$, from about 1,000 $g/m^2/day$ to about 9,000 $g/m^2/day$, from about 3,000 $g/m^2/day$ to about 8,000 $g/m^2/day$, from about 5,000 $g/m^2/day$ to about 7,000 $g/m^2/day$, or about 6,000 $g/m^2/day$. As used herein, the term "about" means ±5% of an indicated value. An example PBT-based TPEE film is TPEE48 manufactured by Far Eastern New Century Corporation in Taipei, Taiwan.

The amount of movement of the underlying base textile in the z-direction caused by the film structures may be dependent on the thickness of the film structures and on the surface area of the film structures. Aspects herein contemplate the film structures having a thickness from about 20 microns to about 100 microns, from about 25 microns to about 90 microns, from about 30 microns to about 80 microns, from about 35 microns to about 70 microns, from about 40 microns to about 60 microns, or about 50 microns. In general, a thicker film structure will cause more movement of the base textile in the z-direction than a thinner film structure dependent on the film structure's thickness being such that moisture is able to diffuse through the film structure within a reasonable time frame. Additionally, a film structure with a greater surface area will cause more deformation of the base textile than a film structure with a smaller surface area.

FIG. 1 illustrates a perspective view of a first surface 105 of a base textile 100 used to form an article of apparel before the base textile 100 is exposed to an external stimulus. The base textile 100 has a width 112 in the x-direction and a length 114 in the y-direction. The base textile 100 includes a plurality of discrete overlay film structures 110. As shown in the magnified view of FIG. 1, the discrete overlay film structures 110 have a generally oval shape with a long axis 115 of each of the film structures 110 oriented in the y-direction and a short axis 117 of each of the film structures 110 oriented in the x-direction; the long axis 115 is longer than the short axis 117. The dimensions of the long axis 115 and the short axis 117 are variable and dependent upon the intended use of the overlay film structures 110. The shape and the orientation of the discrete overlay film structures 110 are illustrative only, and other shapes and orientations are contemplated herein. Using multiple, discrete overlay film structures as opposed to a continuous film allows for more exposure of the base textile 100 which can provide functional advantages based on the characteristics of the base textile 100 such as moisture wicking, permeability, breathability, and the like. Also, use of discrete overlay film structures as opposed to a continuous film allows for fine-tuning of where deformation of the base textile 100 is desired.

The discrete overlay film structures 110 are shown as being applied in a gradient pattern with a greater concentration of the overlay film structures 110 in a first location 116 of the base textile 100 compared to a second location 118 of the base textile. The difference in concentration may be due to, for instance, a decrease in the number of film structures 110 per unit area and/or a change in the size or surface area of the individual film structures 110 per unit area. Applying the film structures 110 in a gradient pattern allows for a customization of the degree of deformation of the base textile 100 when the base textile 100 is exposed to an external stimulus. For instance, more deformation of the base textile 100 may occur in the first location 116 compared to the second location 118. In example aspects, and as shown, the overlay film structures 110 are applied in a grid pattern having generally linear columns and rows of film structures 110. Applying the film structures 110 in a grid pattern enables the base textile 100 to linearly bend or fold in areas between adjacent columns and/or rows of film structures 110 which, for example, improves pliability of the base textile 100.

FIG. 1B is a perspective view of a second opposite surface 130 of the base textile 100 before the base textile 100 is exposed to the external stimulus. As shown, the second surface 130 is generally planar or smooth. In example aspects, the second surface 130 may not include any film structures 110 although it is contemplated herein that film structures 110 may additionally be applied to the second surface 130 of the base textile 100.

FIG. 1C is a cross-sectional view of the base textile 100 in the x-direction (cut line 1C-1C of FIG. 1A), and FIG. 1D is a cross-sectional view of the base textile 100 in the y-direction (cut line 1D-1D of FIG. 1A). The film structures 110 have a thickness 140 before being exposed to an external stimulus. In aspects, the film structures 110 are affixed to the first surface 105 of the base textile 100 using an intermediate adhesive layer that fully adheres the film structures 110 to the base textile 100.

FIG. 2A is a perspective view of the first surface 105 of the base textile 100 after the base textile 100 is exposed to an external stimulus. Upon exposure to the external stimulus, the film structures 110 swell and/or increase in dimension primarily in, for example, the positive z-direction but may also increase in dimension in the positive and/or negative x-direction and/or the positive and/or negative y-direction (i.e., the film structures 110 omni-directionally expand). When the external stimulus is moisture, and the film structures 110 are formed from a PBT-based TPEE film, the swelling of the film structures 110 may be due to the water molecules diffusing through the film. Because the film structures 110 are adhered to the base textile 100, as the film structures 110 increase in dimension, the film structures 110 may "lift" the base textile 100 in the areas underlying the film structures 110 or cause the base textile 100 to move in the positive z-direction in the areas underlying the film structures 110. The result is that the base textile 100 "puckers" to form debossed regions 210 that extend concavely away from the second surface 130 of the base textile 100 and toward the first surface 105. This aspect is shown in FIG. 2B which is a depiction of the second surface 130 of the base textile 100 after the base textile 100 has been exposed to the external stimulus.

In example aspects, when exposed to the external stimulus, the film structures 110 may fold or bend more along their long axes 115 and/or parallel to the long axes 115 compared to their short axes 117 resulting in a greater deformation of the base textile 100 in the x-direction compared to the y-direction. The greater folding or bending along the long axis 115 may be because there is less volume of the base textile 100 to be moved as measured across the short axis 117 of the film structures 110 compared to along the long axis 115 of the film structures 110. This is shown in FIG. 2C which is a cross-sectional view of the base textile 100 in the x-direction of the base textile 100 (cut line 2C-2C of FIG.

2A), and FIG. 2D which is a cross-sectional view of the base textile 100 in the y-direction (cut line 2D-2D of FIG. 2A). As shown in FIG. 2C, after exposure to the external stimulus, the film structures 110 have a thickness 216 where the thickness 216 is greater than the thickness 140. FIG. 2C further depicts the film structures 110 folding or bending along their long axis 115 causing the underlying base textile 100 to also fold or bend in the x-direction which creates the debossed regions 210. As shown in FIG. 2D, there is less folding or bending of the film structures 110 along their short axis 117 and thus less deformation of the base textile 100 in the y-direction. Based on the cumulative effect of the debossed regions 210, the overall width 112 of the base textile 100 may decrease to a new width 212, and there may also be a decrease in the overall length 114 of the base textile 100 to a new length 214. In example aspects, because of the orientation of the film structures 110, there may be a greater decrease in the width of the base textile 100 compared to the length of the base textile 100. To describe this more generally, to achieve a desired decrease of the base textile 100 in a specified direction, the film structures 110 may be oriented such that their long axes are perpendicular to the specified direction.

When the film structures 110 are no longer exposed to, for example, moisture, the film structures 110 undergo a decrease in swelling due to a reduction or cessation of water molecules moving through the film structures 110. The film structures 110 return to their pre-exposure, planar state, the debossed regions 210 relax, and the base textile 100 reverts to its pre-exposure width 112 and length 114. Thus, use of the film structures 110 enables a reversible change in dimension of the base textile 100.

The use of film structures to achieve a decrease in the width and/or length of a base textile may be used to adjust the fit of a garment. For example, FIGS. 3A and 3B depict front and back views respectively of a lower-body garment 300 being worn by a wearer 301 before the lower-body garment 300 is exposed to an external stimulus. The lower-body garment 300 is formed from a base textile 302 and includes a front torso area 310 (shown in FIG. 3A) and a back torso area 312 (shown in FIG. 3B) that define a waist opening 313 having a waist circumference 315. The lower-body garment 300 also includes a first leg portion 314 having a first leg opening 317, and a second leg portion 316 having a second leg opening 319. The first leg portion 314 and the second leg portion 316 may each have a circumference 321. Although shown as a short, it is contemplated herein that the lower-body garment 300 may be a pant, a three-quarter pant, a tight, and the like. In one example aspect, the lower-body garment 300 may be a board short used for swimming and/or surfing. With respect to this aspect, the base textile 302 may be a tightly woven construction formed from polyester yarns and/or nylon yarns and optionally including elastomeric yarns. The use of a tightly woven construction along with yarns having a low moisture regain (e.g., polyester and/or nylon) helps to prevent the yarns forming the base textile from absorbing excess water and helps to prevent water from accumulating in the spaces between the yarns forming the base textile.

In an optional aspect, the lower-body garment 300 includes a first plurality of discrete overlay film structures 324 that extend circumferentially around the front torso area 310 and the back torso area 312 adjacent to (e.g., within about 0 cm to about 20 cm) the waist opening 313. Although shown as being positioned adjacent to the waist opening 313, it is contemplated herein that the film structures 324 may be positioned uniformly on the front torso area 310 and the back torso area 312. The lower-body garment 300 also includes a second plurality of discrete overlay film structures 326 that extend circumferentially around the first leg portion 314 and a third plurality of discrete overlay film structures 328 that extend circumferentially around the second leg portion 316. The film structures 326 and 328 are positioned adjacent to (e.g., within about 0 cm to about 20 cm) from the first leg opening 317 and the second leg opening 319 respectively. The film structures 324, 326, and 328 are shown applied to the outer-facing surface of the lower-body garment 300, but aspects herein contemplate the film structures 324, 326, and 328 being applied to the inner-facing surface of the lower-body garment 300.

The location and number of film structures 324, 326, and 328 are illustrative and it is contemplated that the lower-body garment 300 may include just the film structures 324 or just the film structures 326 and/or 328. The lower-body garment 300 may include additional film structures (not shown) to achieve an adaptive fit in other locations on the lower-body garment 300. For example, the lower-body garment 300 may include film structures that are positioned just on the front torso area 310 or the front of the first and second leg portions 314 and 316, or just on the back torso area 312 or the back of the first and second leg portions 314 and 316 such that the film structures do not extend circumferentially around the respective torso area or leg portions. Positioning the film structures as described may cause a change in dimension of the base textile that is limited to the front or back of the lower-body garment 300 (e.g., a localized change in dimension). Any and all aspects, and any variation thereof, are contemplated as being within aspects herein.

To achieve the desired adaptive fit, and as explained below, the first, second, and third pluralities of discrete overlay film structures 324, 326, and 328 are oriented with each of their long axes extending along the length of the lower-body garment 300 (the y-direction) and each of their short axes extending along the width of the lower-body garment 300 (the x-direction). To further achieve the desired adaptive fit with respect to the first and second leg portions 314 and 316, there is a greater concentration of the film structures 326 and 328 at the distal ends of the first and second leg portions 314 and 316 (closer to the respective first and second leg openings 317 and 319) compared to the proximal ends of the first and second leg portions 314 and 316. The greater concentration of the film structures 326 and 328 at the distal ends of the first and second leg portions 314 and 316 compared to the proximal ends of the leg portions 314 and 316 may be due to a decrease in number of the film structures 326 and 328 when moving from the distal end to the proximal end and/or a decrease in the size of the film structures 326 and 328 when moving from the distal end to the proximal end. Having a greater concentration of the film structures 326 and 328 at the distal ends of the first and second leg portions 314 and 316 facilitates a greater decrease in circumference of the first and second leg portions 314 and 316 in this area resulting in a close fit of the lower-body garment 300 in the lower thigh/knee area of the wearer. As well, in optional aspects, there may be a greater concentration of the film structures 326 and 328 on the lateral aspects of the first and second leg portions 314 and 316 compared to the medial aspects of the first and second leg portions 314 and 316. Concentrating the film structures 326 and 328 more on the lateral aspects than the medial aspects of the first and second leg portions 314 and 316 may reflect the construction of a typical short where there may be a greater volume of material on the lateral sides of the leg portions compared to the inseam area and may also reduce opportunities for chafing between the film structures 326 and 328 and the sensitive skin at the inner thigh area of a wearer especially when the film structures 326 and 328 are positioned on the inner-facing surface of the lower-body garment 300.

As shown in FIGS. 3A and 3B, the lower-body garment 300 may not be closely adherent to the wearer's waist or legs to achieve a more casual aesthetic. In other words, there may be some extra space between, for instance, the wearer's waist and the waist opening 313 of the lower-body garment 300 and between the wearer's legs and the first and second leg openings 317 and 319 of the lower-body garment 300. This may be desirable in some situations, but in other situations, the wearer may desire a closer fit in these areas to, for example, reduce drag.

FIGS. 3C and 3D depict front and back views respectively of the lower-body garment 300 after the garment 300 has been exposed to an external stimulus such as moisture or water. As explained with respect to the base textile 100, exposure of the film structures 324, 326, and 328 to the external stimulus causes the film structures 324, 326, and 328 to expand, for instance, at least in the positive z-direction and/or in the x-direction and the y-direction, and to fold or bend at least along their long axes. Because each of the long axes of the film structures 324, 326, and 328 is oriented along the length (or y-direction) of the lower-body garment 300, the folding or bending of the film structures 324, 326, and 328 along their long axes causes the base textile 302 to shorten in the x-direction based on movement of the base textile 302 in the positive z-direction by the film structures 324, 326, and 328. Due to the film structures 324, 326, and 328 being applied circumferentially around the first and second leg portions 314 and 316 and the waist opening 313 of the lower-body garment 300, the cumulative shortening of the base textile 302 in the x-direction in these areas causes the circumference of the waist opening 313 and the first and second leg portions 314 and 316 to decrease. For instance, after exposure to the external stimulus, the waist opening 313 may have a waist circumference 340 that is less than the waist circumference 315, and the first and second leg portions 314 and 316 may have a circumference 342 that is less than the circumference 321 of the first and second leg portions 314 and 316 before the lower-body garment 300 is exposed to the external stimulus. When the film structures 324 are applied uniformly to the front torso area 310 and the back torso area 312 of the lower-body garment 300, the circumference of the entire torso portion of the lower-body garment 300 may decrease.

Figure 3F:
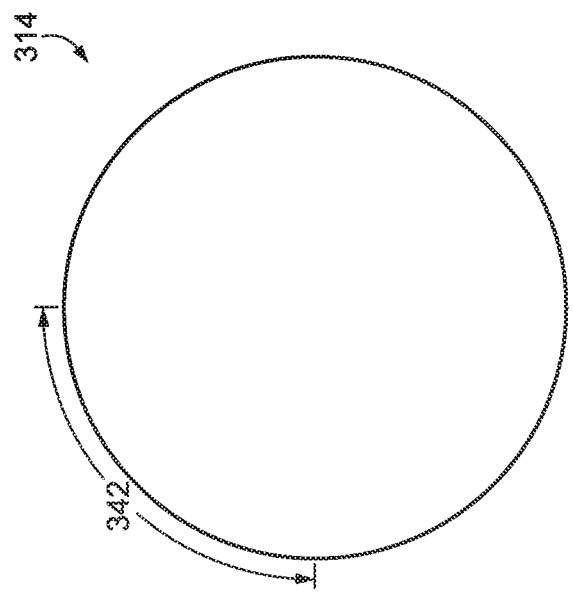
FIG. 3F illustrates a cross-sectional view of the leg portion of the lower-body garment of FIG. 3C taken along cut line 3F-3F in accordance with aspects herein.

This decrease in circumference is shown in FIG. 3E which is a cross-sectional view of the first leg portion 314 of FIG. 3A taken along cut line 3E-3E, and FIG. 3F which is a cross-sectional view of the first leg portion 314 of FIG. 3C taken along cut line 3F-3F. FIG. 3E illustrates the first leg portion 314 having the circumference 321 before the lower-body garment 300 is exposed to the external stimulus. FIG. 3F illustrates the first leg portion 314 having the circumference 342 after the lower-body garment 300 is exposed to the external stimulus where the circumference 342 is less than the circumference 321. The second leg portion 316 and the waist opening 313 would exhibit a similar decrease in circumference. In example aspects, the decrease in circumference of the respective portions may be about 3%, about 5%, about 10%, about 15%, or about 20% although values less than and greater than these are contemplated as being within the scope herein.

The tightening of the waist opening 313 and the first and second leg portions 314 and 316 may create a more aerodynamic or hydrodynamic profile for the lower-body garment 300 and reduce potential drag points. This may be beneficial in sports such as swimming, running, surfing, and the like. When the lower-body garment 300 is no longer exposed to the external stimulus, the film structures 324, 326, and 328 transition back to flattened state, the deformation of the base textile 302 relaxes, and the circumferences 340 and 342 revert to the circumferences 315 and 321 respectively.

Figure 4A:
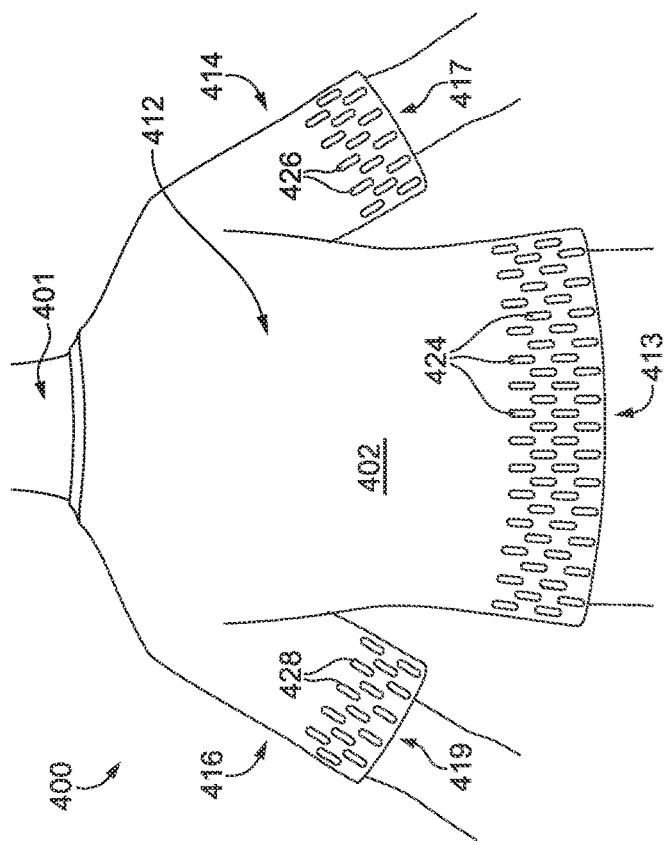
FIGS. 4A-4B illustrate a front view and a back view respectively of an example upper-body garment having a plurality of discrete overlay film structures before the upper-body garment is exposed to an external stimulus in accordance with aspects herein.
Figure 4B:
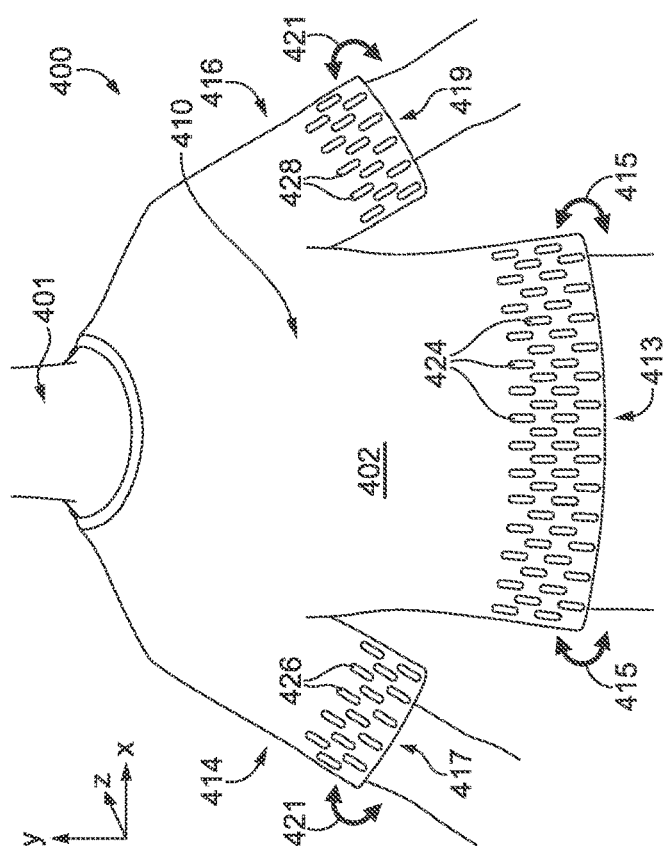

The film structures may also be used to adjust the fit of an upper-body garment such as upper-body garment 400 shown in FIGS. 4A-4D. FIGS. 4A and 4B depict front and back views respectively of the upper-body garment 400 being worn by a wearer 401 before the upper-body garment 400 is exposed to an external stimulus. The upper-body garment 400 is formed from a base textile 402 and includes a front torso area 410 (shown in FIG. 4A) and a back torso area 412 (shown in FIG. 4B) that define a waist opening 413 having a waist circumference 415. The upper-body garment 400 also includes a first sleeve portion 414 having a first sleeve opening 417, and a second sleeve portion 416 having a second sleeve opening 419. The first sleeve opening 417 and the second sleeve opening 419 may each have a circumference 421. Although shown as a pull-over shirt, it is contemplated herein that the upper-body garment 400 may comprise a jacket, a long-sleeved shirt, a three-quarter sleeve shirt, a tank top, a hoodie, and the like.

The upper-body garment 400 is depicted as including three sets of overlay film structures including a first plurality of discrete overlay film structures 424 that extend circumferentially around the front torso area 410 and the back torso area 412 adjacent to (e.g., within about 0 cm to about 20 cm) the waist opening 413. This positioning is illustrative only, and it is contemplated herein that the film structures 424 may be positioned uniformly between a neck opening of the upper-body garment 400 and the waist opening 413 to facilitate an overall decrease in circumference of the torso portion of the upper-body garment 400 when the upper-body garment 400 is exposed to an external stimulus.

The upper-body garment 400 also includes a second plurality of discrete overlay film structures 426 that extend circumferentially around the first sleeve portion 414 and a third plurality of discrete overlay film structures 428 that extend circumferentially around the second sleeve portion 416. The film structures 426 and 428 are positioned adjacent to (e.g., within about 0 cm to about 20 cm) the first sleeve opening 417 and the second sleeve opening 419 respectively although it is contemplated herein that the film structures 426 and 428 may be applied uniformly to the first sleeve portion 414 and the second sleeve portion 416. The film structures 424, 426, and 428 are shown as applied to the outer-facing surface of the upper-body garment 400, but aspects herein contemplate the film structures 424, 426, and 428 being applied to the inner-facing surface of the upper-body garment 400. The location and number of the film structures 424, 426, and 428 is illustrative and it is contemplated that the upper-body garment 400 may include just the film structures 424 or just the film structures 426 and/or 428. The upper-body garment 400 may include additional film structures (not shown) to achieve an adaptive fit in other locations on the upper-body garment 400 such as film structures located on just the front torso area 410 or the front of the first and/or second sleeve portions 414 and/or 416, or film structures located on just the back torso area 412 or the back of the first and/or second sleeve portions 414 and/or 416. Any and all aspects, and any variation thereof, are contemplated as being within aspects herein.

To achieve a desired adaptive fit, the first, second, and third pluralities of discrete overlay film structures 424, 426, and 428 are oriented with each of their long axes extending along the length of the upper-body garment 400 (the y-direction) and each of their short axes extending along the width of the upper-body garment 400 (the x-direction). In example aspects, to further achieve the desired adaptive fit with respect to the first and second sleeve portions 414 and 416, there may be a greater concentration of the film structures 426 and 428 at the distal ends of the first and second sleeve portions 414 and 416 (closer to the first and second sleeve openings 417 and 419) compared to the proximal ends of the first and second sleeve portions 414 and 416 (farther away from the first and second sleeve openings 417 and 419). Although not shown, there may also be a greater concentration of the film structures 426 and 428 on the lateral aspects of the first and second sleeve portions 414 and 416 compared to the medial aspects of the first and second sleeve portions 414 and 416. As illustrated in FIGS. 4A and 4B, the upper-body garment 400 may not be closely adherent to the wearer's waist or arms to provide a more casual aesthetic.

FIGS. 4C and 4D depict front and back views respectively of the upper-body garment 400 after the garment 400 has been exposed to an external stimulus such as moisture or water. Exposure of the film structures 424, 426, and 428 to the external stimulus causes the film structures 424, 426, and 428 to expand, for instance, at least in the positive z-direction and/or in the x-direction and the y-direction, and to fold or bend at least along their long axes. Because each of the long axes of the film structures 424, 426, and 428 are oriented along the length (or y-direction) of the upper-body garment 400 or along the length of the first and second sleeve portions 414 and 416, the folding or bending of the film structures 424, 426, and 428 along their long axes causes the base textile 402 to shorten in the x-direction based on movement of the base textile 402 in the positive z-direction by the film structures 424, 426, and 428. Due to the film structures 424, 426, and 428 being applied circumferentially around the first and second sleeve portions 414 and 416 and the waist opening 413 of the upper-body garment 400, the cumulative shortening of the base textile 402 in the x-direction in these areas causes the circumference of the waist opening 413 and the first and second sleeve portions 414 and 416 to decrease. For instance, after exposure to the external stimulus, the waist opening 413 may have a waist circumference 440 that is less than the waist circumference 415, and the first and second sleeve portions 414 and 416 may have a circumference 442 that is less than the circumference 421 of the first and second sleeve portions 414 and 416 before the upper-body garment 400 is exposed to the external stimulus.

The film structures described with respect to the lower-body garment 300 and the upper-body garment 400 may be oriented in different directions than shown. For example, if a decrease in the length of a garment is desired (e.g., a shortening of a pant leg length or an arm sleeve length), the film structures may be oriented so that each of their long axes extend in the x-direction and each of their short axes extend in the y-direction. If shortening of the garment is desired along a diagonal axis (an axis skewed from the x-direction and the y-direction), each of the long axes of the film structures may be oriented perpendicular to the desired diagonal axis. When a generally equal decrease in the length and the width of a garment is desired, film structures that have a uniform axis along their length and width (e.g., circular film structures, square film structures) may be used at a desired location on the garment. Any and all aspects, and any variation thereof, are contemplated as being within aspects herein.

Figure 5A:
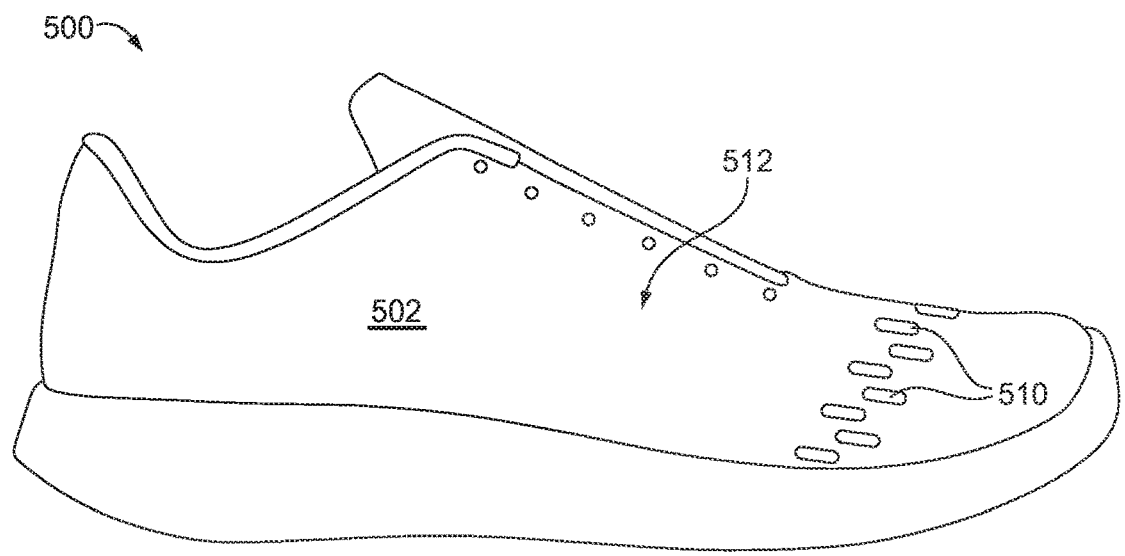
FIG. 5A illustrates an example article of footwear having a plurality of discrete overlay film structures in accordance with aspects herein.

The film structures described herein may be applied to other articles of apparel besides garments. FIG. 5A depicts an article of footwear in the form of a shoe 500 formed of a base textile 502. A first plurality of overlay film structures 510 are shown applied to a forefoot portion of a shoe upper 512 with the long axes of the film structures 510 oriented in a toe-to-heel direction and the short axes of the film structures 510 oriented in a medial-to-lateral direction. Although shown as being applied to the outer-facing surface of the shoe upper 512, it is contemplated herein that the film structures 510 may be applied to the inner-facing surface of the shoe upper 512. When the film structures 510 are exposed to an external stimulus, such as moisture, the film structures 510 may swell and/or fold along their long axes causing a tightening of the shoe upper 512 in a medial-to-lateral direction. This may be useful to create a tighter fit and prevent a wearer's foot from sliding when the shoe 500 is exposed to, for example, water. Once the external stimulus is removed, the shoe 500 reverts to a more loose fit. The location and shape of the film structures 510 on the upper 512 is illustrative, and it is contemplated herein that the shoe 500 may include additional film structures with different orientations to achieve a desired fit. For example, the long axes of the film structures 510 may be oriented in a medial-to-lateral direction to cause a shortening of the shoe upper 512 in a toe-to-heel direction. In another example, the film structures 510 may have a uniform axis (e.g., a circle shape), and when the shoe upper 512 is exposed to the external stimulus, the shoe upper 512 may undergo a shortening in the medial-to-lateral direction and the toe-to-heel direction.

Figure 5B:
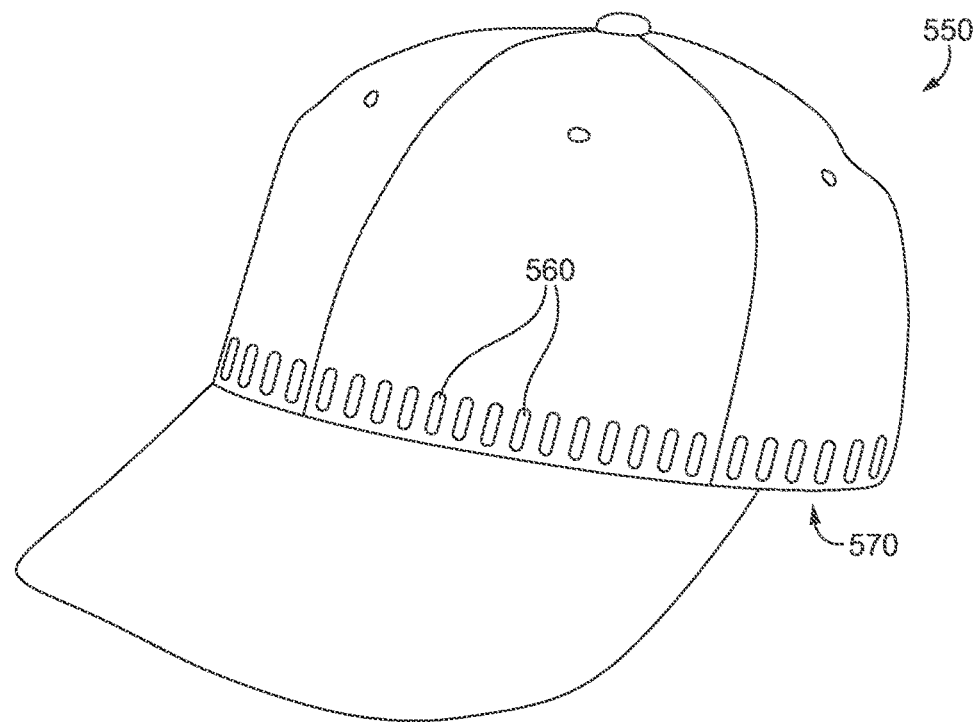
FIG. 5B illustrates an example article of headwear having a plurality of discrete overlay film structures in accordance with aspects herein.

The film structures may be applied to other articles of footwear such as socks to create a tighter fit when the sock is exposed to, for example, moisture, which may prevent the sock from shifting with respect to the wearer's skin surface. The film structures may also be applied to other articles of apparel such as, for example, hats. FIG. 5B illustrates a hat 550 having a plurality of discrete overlay film structures 560 applied circumferentially around a lower edge 570 of the hat 550 with the long axes of the film structures 560 oriented perpendicular to the lower edge 570. When the hat 550 is exposed to, for instance, moisture, the circumference of the hat 550 may tighten thus helping the hat 550 remain securely seated on the head of the wearer. Although the film structures 560 are shown as applied to an outer-facing surface of the hat 550, it is contemplated herein that the film structures 560 may be applied to an inner-facing surface of the hat 550. Any and all aspects, and any variation thereof, are contemplated as being within the scope herein.

The oval shape depicted for the film structures is just one example of different shape configurations for the film structures. FIGS. 6A-6C depict example alternative shapes for the film structures. FIG. 6A depicts a base textile 605 having film structures 610 with a circular shape. Because a circular shape has a fixed diameter, swelling of the film structures 610 would cause a generally equal decrease in both the width and length of the base textile 605. FIG. 6B depicts a base textile 615 having film structures 620 with a diamond shape. Because a diamond shape has a generally equal length and width, swelling of the film structures 620 would also cause a generally equal decrease in both the width and length of the base textile 615. FIG. 6C depicts a base textile 625 having film structures 630 with a quadrilateral shape having two pairs of equal length sides that are adjacent to each other. Similar to the oval shape, the film structures 630 have a long axis and a short axis and thus would generally cause an unequal change in dimension of the base textile 625 when the base textile 625 is exposed to an external stimulus. Additional shapes for the film structures are contemplated herein including asymmetric shapes such as crescents, organic shapes, half-circle shapes, alphanumeric shapes, and the like. As well, it is contemplated herein that the base textile may include a number of different shaped film structures and/or film structures with different sizes and/or surface areas. Any and all aspects, and any variation thereof, are contemplated as being within aspects herein.

The film structures that are applied to a base textile may have different thicknesses. FIG. 7A depicts a base textile 705 before the base textile 705 is exposed to an external stimulus, The base textile 705 includes a first film structure 710 with a first thickness 715 and a second film structure 720 with a second thickness 725 that is less than the first thickness 715 of the first film structure 710. FIG. 7B illustrates the base textile 705 after being exposed to an external stimulus, such as moisture. The first film structure 710 increases in dimension in at least the z-direction to thickness 730, and the second film structure 720 increases in dimension in at least the z-direction to thickness 735, where the thickness 735 is less than the thickness 730. Because the first film structure 710 is thicker than the second film structure 720, it may cause a greater movement of the base textile 705 in the z-direction when exposed to the external stimulus as shown by the first film structure 710 having a greater offset 740 than an offset 742 associated with the second film structure 720 after the base textile 705 is exposed to the external stimulus.

Figure 8:
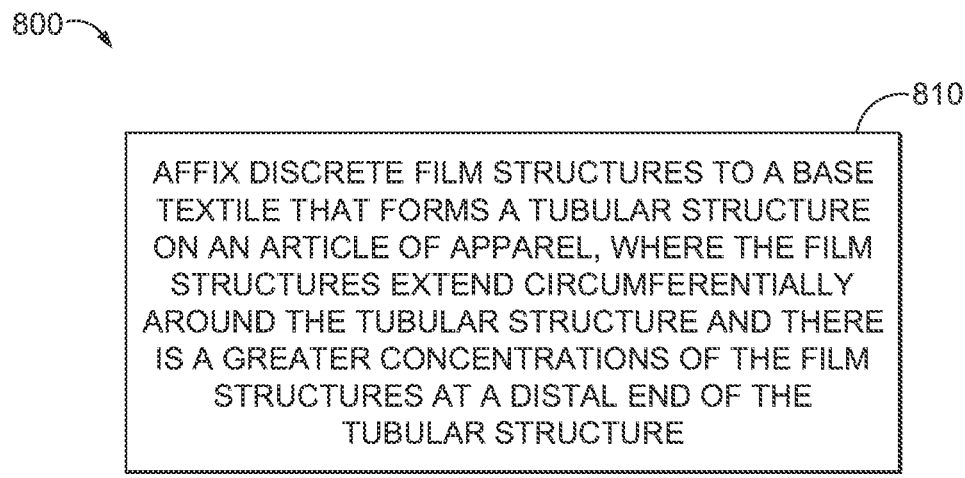
FIG. 8 illustrates a flow diagram of an example method of manufacturing an article of apparel that includes discrete overlay film structures in accordance with aspects herein.

FIG. 8 depicts a flow diagram of an example method of manufacturing an article of apparel with a tubular structure and is referenced generally by the numeral 800. At a step 810, a plurality of discrete overlay film structures, such as the film structures 110, are affixed to a base textile, such as the base textile 100, that forms a tubular structure. In aspects, the tubular structure may include a leg portion, a sleeve portion, and/or a torso portion of an article of apparel. The plurality of discrete overlay film structures may be applied to have a greater concentration of film structures at a distal end of the tubular structure compared to a proximal end to achieve a greater decrease in dimension of the base textile in this area. For instance, when the tubular structure is a leg portion or a sleeve portion, the film structures may be affixed adjacent to a distal leg opening or a distal sleeve opening. In further example aspects, when the tubular structure is a leg portion or a sleeve portion, the film structures may be applied to have a greater concentration on a lateral aspect of the respective leg or sleeve portion compared to a medial aspect of the respective leg or sleeve portion to achieve a greater decrease in dimension on the lateral aspect of the leg or sleeve portion compared to the medial aspect. Any and all aspects, and any variation thereof, are contemplated as being within aspects herein.

In one example method of construction, a sheet of the film material described herein (e.g., the TPEE film) may be affixed to an adhesive film, such as a pressure-sensitive adhesive film, having a carrier sheet applied to its opposite surface. The film material may then be cut to form the discrete film structures, and the excess material may be removed. When the film structures are ready to be applied to the article of apparel, the carrier sheet may be removed, and the film structures may be affixed to the base textile using, for instance, pressure. This is just one example method of construction and other methods of applying the film structures to the apparel item are contemplated herein.

As described, aspects herein contemplate providing an adaptive and customized fit to articles of apparel based on, for example, selection of a base textile to achieve more or less movement of the base textile in the z-direction based on the types of yarns used to form the base textile, the presence or absence of elastomeric yarns, and/or the weight of the base textile. The degree of movement of the base textile in the z-direction may also be adjusted by varying the thickness of the overlay film structures affixed to the base textile, where a greater thickness may cause a greater movement of the base textile in the z-direction, and by varying the surface area of the overlay film structures, where a greater surface area may cause a greater deformation of the base textile. A greater decrease in dimension of the base textile along a certain direction compared to an orthogonal direction may be achieved by forming the film structures to have a long axis and a short axis and orienting the long axis of the film structures perpendicular to the desired decrease in dimension. The positioning of the film structures on the article of apparel may be selected to achieve a change in fit in certain areas of the garment. For instance, as described, the film structures may be positioned circumferentially around a tubular structure such as an arm or leg portion, or a torso portion of a garment to achieve a decrease in the circumference of the tubular structure. In another example, the film structures may be positioned selectively on the front of a garment to achieve a change in fit of the front of the garment while maintaining the level of fit in the back of the garment. In addition, the concentration of the film structures at locations on the article of apparel may be varied to provide for a greater or lesser change in fit upon exposure to an external stimulus. Any and all aspects, and any variation thereof, are within the scope of aspects herein.

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are illustrative in nature and are not limiting.

Clause 1. An article of apparel comprising:
a base textile; and
a plurality of discrete overlay film structures affixed to the base textile, wherein upon exposure to moisture the plurality of discrete overlay film structures undergo a change in dimension in at least a z-direction, and the base textile undergoes a decrease in one or more of width in an x-direction and length in a y-direction.

Clause 2. The article of apparel according to clause 1, wherein the plurality of discrete overlay film structures are affixed to an inner-facing surface of the article of apparel.

Clause 3. The article of apparel according to any of clauses 1 through 2, wherein the plurality of discrete overlay film structures are affixed to an outer-facing surface of the article of apparel.

Clause 4. The article of apparel according to any of clauses 1 through 3, wherein the article of apparel comprises an upper-body garment, and wherein the plurality of discrete overlay film structures are affixed to one or more of a front torso area, a back torso area, and a sleeve portion of the upper-body garment.

Clause 5. The article of apparel according to any of clauses 1 through 3, wherein the article of apparel comprises a lower-body garment, and wherein the plurality of discrete overlay film structures are affixed to one or more of a front torso area, a back torso area, and a leg portion of the lower-body garment.

Clause 6. The article of apparel according to any of clauses 1 through 5, wherein the plurality of discrete overlay film structures comprise a thermoplastic polyester elastomer.

Clause 7. The article of apparel according to any of clauses 1 through 6, wherein each of the plurality of discrete overlay film structures has a thickness from about 20 microns to about 100 microns.

Clause 8. A lower-body garment having a torso portion, a first leg portion, and a second leg portion, the lower-body garment comprising:
    a base textile forming the first leg portion and the second leg portion; and
    a plurality of discrete overlay film structures affixed to the base textile and extending circumferentially around the first leg portion and the second leg portion, wherein upon exposure to moisture the plurality of discrete overlay film structures undergo a change in dimension in at least a z-direction, and the first leg portion and the second leg portion undergo a decrease in circumference.

Clause 9. The lower-body garment according to clause 8, wherein the base textile comprises a woven construction.

Clause 10. The lower-body garment according to any of clauses 8 through 9, wherein the base textile is formed from one or more of polyester yarns and nylon yarns.

Clause 11. The lower-body garment according to any of clauses 8 through 10, wherein the base textile includes elastomeric yarns.

Clause 12. The lower-body garment according to any of clauses 8 through 11, wherein the plurality of discrete overlay film structures are affixed adjacent to a first leg opening of the first leg portion and a second leg opening of the second leg portion.

Clause 13. The lower-body garment according to any of clauses 8 through 12, wherein the plurality of discrete overlay film structures are affixed to an inner-facing surface of the lower-body garment.

Clause 14. The lower-body garment according to any of clauses 8 through 13, wherein there is a greater concentration of the plurality of discrete overlay film structures at a distal end of each of the first leg portion and the second leg portion compared to a proximal end of the first leg portion and the second leg portion.

Clause 15. The lower-body garment according to any of clauses 8 through 14, wherein there is a greater concentration of the plurality of discrete overlay film structures on a lateral aspect of the first leg portion and the second leg portion compared to a medial aspect of the first leg portion and the second leg portion.

Clause 16. The lower-body garment according to any of clauses 8 through 15, wherein each of the plurality of discrete overlay film structures comprises a long axis and a short axis.

Clause 17. The lower-body garment according to clause 16, wherein the long axis of the each of the plurality of discrete overlay film structures is oriented generally parallel to an axis that extends between a waist opening of the lower-body garment and a leg opening of the lower-body garment.

Clause 18. A method of manufacturing an article of apparel having a tubular structure, the method of manufacturing comprising:
    affixing a plurality of discrete overlay film structures to a base textile that forms the tubular structure, wherein the plurality of discrete overlay film structures are affixed so as to extend circumferentially around the tubular structure, and wherein there is a greater concentration of the plurality of discrete overlay film structures at a distal end of the tubular structure compared to a proximal end of the tubular structure when the article of apparel is in an as-worn configuration.

Clause 19. The method of manufacturing the article of apparel according to clause 18, wherein there is a greater concentration of the plurality of discrete overlay film structures on a lateral aspect of the tubular structure compared to a medial aspect of the tubular structure.

Clause 20. The method of manufacturing the article of apparel according to any of clauses 18 through 19, wherein the tubular structure comprises one of a sleeve portion or a leg portion of the article of apparel.

Clause 21. An article of footwear comprising:
    a base textile;
    a plurality of discrete overlay film structures affixed to the article of footwear, wherein upon exposure to moisture the plurality of discrete overlay film structures undergo a change in dimension in at least a z-direction, and the article of footwear undergoes a decrease in dimension in one or more of a toe-to-heel direction or a medial-to-lateral direction.

Clause 22. The article of footwear according to clause 21, wherein each of the plurality of discrete overlay film structures includes a long axis and a short axis.

Clause 23. The article of footwear according to clause 22, wherein the long axis of at least a portion of the plurality of discrete overlay film structures is oriented in a toe-to-heel direction, and wherein the decrease in dimension of the article of footwear is in the medial-to-lateral direction.

Clause 24. The article of footwear according to any of clauses 22 through 23, wherein the long axis of at least a portion of the plurality of discrete overlay film structures is oriented in a medial-to-lateral direction, and wherein the decrease in dimension of the article of footwear is in the toe-to-heel direction.

Clause 25. The article of footwear according to any of clauses 21 through 24, wherein the article of footwear is an upper of a shoe.

Clause 26. The article of footwear according to any of clauses 21 through 24, wherein the article of footwear is a sock.

Clause 27. An article of headwear comprising:
    a base textile; and
    a plurality of discrete overlay film structures affixed to the article of headwear, wherein upon exposure to moisture the plurality of discrete overlay film structures undergo a change in dimension in at least a z-direction, and the article of headwear undergoes a decrease in circumference.

Clause 28. The article of headwear according to clause 27, wherein the plurality of discrete overlay film structures extend circumferentially around the article of headwear adjacent to a lower edge of the article of headwear.

Clause 29. The article of headwear according to any of clauses 27 through 28, wherein each of the plurality of discrete overlay film structures includes a long axis and a short axis, and wherein the long axis of the each of the plurality of discrete overlay film structures is oriented perpendicular to the lower edge of the article of headwear.

Clause 30. An article of apparel comprising:
    a base textile; and
    a plurality of discrete overlay film structures affixed to the base textile, each of the plurality of discrete overlay film structures having a long axis and a short axis, wherein upon exposure to moisture, the base textile undergoes a decrease in dimension in a direction perpendicular to the long axes of the plurality of discrete overlay film structures.

Clause 31. The article of apparel according to clause 30, wherein the long axes of the plurality of discrete overlay film structures are oriented in a same direction on the base textile.

Clause 32. The article of apparel according to any of clauses 30 through 31, wherein upon the exposure to moisture, the plurality of discrete overlay film structures undergo an increase in dimension in at least a z-direction.

Clause 33. The article of apparel according to any of clauses 30 through 32, wherein the plurality of discrete overlay film structures are affixed to an outer-facing surface of the article of apparel.

Clause 34. The article of apparel according to any of clauses 30 through 32, wherein the plurality of discrete overlay film structures are affixed to an inner-facing surface of the article of apparel.

Clause 35. The article of apparel according to any of clauses 30 through 34, wherein there is a gradient in size and surface area of the plurality of discrete overlay film structures.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. An article of apparel comprising:
    a base textile comprising a tubular structure; and
    a plurality of discrete overlay film structures affixed to the base textile and circumferentially around the tubular structure, wherein upon exposure to moisture the plurality of discrete overlay film structures, by diffusing moisture from one surface to an opposite surface, undergo a change in dimension in at least a z-direction, and the base textile undergoes a decrease in one or more of width in an x-direction and length in a y-direction, and wherein the decrease in the one or more of the width and the length is associated with a tighter fit of the tubular structure.

2. The article of apparel of claim 1, wherein the plurality of discrete overlay film structures are affixed to an inner-facing surface of the article of apparel.

3. The article of apparel of claim 1, wherein the plurality of discrete overlay film structures are affixed to an outer-facing surface of the article of apparel.

4. The article of apparel of claim 1, wherein the article of apparel comprises a lower-body garment, and wherein the plurality of discrete overlay film structures are affixed to one or more of a front torso area, a back torso area, and a leg portion of the lower-body garment.

5. The article of apparel of claim 1, wherein the plurality of discrete overlay film structures comprise a thermoplastic polyester elastomer.

6. The article of apparel of claim 5, wherein each of the plurality of discrete overlay film structures has a thickness from about 20 microns to about 100 microns.

7. The article of apparel of claim 1, wherein the plurality of discrete overlay film structures comprises a row of discrete overlay film structures, and wherein the row extends circumferentially around the tubular structure with the discrete overlay film structures spaced apart from one another within the row.

8. A lower-body garment having a torso portion, a first leg portion, and a second leg portion, the lower-body garment comprising:
    a base textile forming the first leg portion and the second leg portion; and
    a plurality of discrete overlay film structures affixed to the base textile and extending circumferentially around the first leg portion and the second leg portion, wherein upon exposure to moisture the plurality of discrete overlay film structures undergo a change in dimension in at least a z-direction, and the first leg portion and the second leg portion undergo a decrease in circumference.

9. The lower-body garment of claim 8, wherein the base textile comprises a woven construction.

10. The lower-body garment of claim 8, wherein the base textile is formed from one or more of polyester yarns and nylon yarns.

11. The lower-body garment of claim 8, wherein the base textile includes elastomeric yarns.

12. The lower-body garment of claim 8, wherein the plurality of discrete overlay film structures are affixed adjacent to a first leg opening of the first leg portion and a second leg opening of the second leg portion.

13. The lower-body garment of claim 8, wherein the plurality of discrete overlay film structures are affixed to an inner-facing surface of the lower-body garment.

14. The lower-body garment of claim 8, wherein the plurality of discrete overlay film structures comprises a gradient pattern, which gradually transitions from, at a proximal region of each of the first leg portion and the second leg portion, a lower concentration of the plurality of discrete overlay firm structures, to a greater concentration of the plurality of discrete overlay film structures at a distal end of each of the first leg portion and the second leg portion.

15. The lower-body garment of claim 8, wherein each of the plurality of discrete overlay film structures comprises a long axis and a short axis.

16. The lower-body garment of claim 15, wherein the long axis of the each of the plurality of discrete overlay film structures is oriented generally parallel to an axis that extends between a waist opening of the lower-body garment and a leg opening of the lower-body garment.

17. The lower-body garment of claim 8, wherein:
    the first leg portion comprises a lateral aspect and a medial aspect; and
    at least a portion of the plurality of discrete overlay film structures are on each of the lateral aspect and the medial aspect.

18. The lower-body garment of claim 17, wherein there is a greater concentration of the plurality of discrete overlay film structures on the lateral aspect of the first leg portion compared to the medial aspect of the first leg portion.

19. The lower-body garment of claim 8, wherein:
    the first leg portion comprises a front panel, a back panel, lateral aspect, and a medial aspect; and at least a portion of the plurality of discrete overlay film structures are on each of the front panel, the back panel, the lateral aspect, and the medial aspect.

20. The lower-body garment of claim 8, wherein the plurality of discrete overlay film structures are consistently distributed around the circumference of the first leg portion and the second leg portion.

21. The lower-body garment of claim 8, wherein the decrease in circumference causes the first leg portion and the second leg portion to fit more closely to a user's legs.

\* \* \* \* \*